United States Patent [19]
Ferland

[11] Patent Number: 6,014,834
[45] Date of Patent: Jan. 18, 2000

[54] INSECT BAIT TRAP

[76] Inventor: Bret Ferland, 68 Rodney Ave., Islip Terrace, N.Y. 11752

[21] Appl. No.: 09/093,289

[22] Filed: Jun. 8, 1998

[51] Int. Cl.$^7$ ..................................................... A01M 1/20
[52] U.S. Cl. ................................................ 43/131; 43/121
[58] Field of Search ............................. 43/107, 121, 131, 43/132.1, 54.1

[56] References Cited

U.S. PATENT DOCUMENTS

| | | | |
|---|---|---|---|
| 149,918 | 4/1874 | Clough | 43/121 |
| 584,378 | 6/1897 | Lewis | 43/107 |
| 794,637 | 7/1905 | Park et al. | 43/131 |
| 1,540,621 | 6/1925 | Hanson et al. | 43/131 |
| 1,916,982 | 7/1933 | Jones | 43/131 |
| 1,936,644 | 11/1933 | Schroder | 43/121 |
| 2,000,193 | 5/1935 | Schroder | 43/131 |
| 2,219,403 | 10/1940 | Sennewald | 43/131 |
| 2,254,948 | 9/1941 | Kubalek | 43/131 |
| 2,291,358 | 7/1942 | Treadwell et al. | 43/131 |
| 2,320,077 | 5/1943 | Hansen | 43/131 |
| 2,741,066 | 4/1956 | Conway | 43/121 |
| 2,781,607 | 2/1957 | Smiley | 43/131 |
| 2,896,361 | 7/1959 | Allen | 43/131 |
| 2,912,788 | 11/1959 | Hargrove | 43/131 |
| 2,944,364 | 7/1960 | Kelly | 43/131 |
| 3,122,857 | 3/1964 | Yates | 43/131 |
| 3,173,223 | 3/1965 | Dunn et al. | 43/131 |
| 3,223,231 | 12/1965 | Connolly | 43/131 |
| 3,303,599 | 2/1967 | Ballard | 43/131 |
| 3,320,692 | 5/1967 | Hellen | 43/131 |
| 3,391,483 | 7/1968 | Marlman | 43/131 |
| 3,517,454 | 6/1970 | Query | 43/131 |
| 3,750,326 | 8/1973 | Haubtmann | 43/131 |
| 3,802,116 | 4/1974 | Meguro et al. | 43/121 |
| 3,828,464 | 8/1974 | Peace | 43/131 |
| 3,864,867 | 2/1975 | Dry | 43/131 |
| 3,885,341 | 5/1975 | Kuchenbecker et al. | 43/121 |
| 4,161,079 | 7/1979 | Hill | 43/131 |
| 4,175,352 | 11/1979 | Catlett | 43/139 |
| 4,208,828 | 6/1980 | Hall et al. | 43/121 |
| 4,279,095 | 7/1981 | Assen | 43/139 |
| 4,349,982 | 9/1982 | Sherman | 43/131 |
| 4,400,905 | 8/1983 | Brown | 43/132.1 |
| 4,658,636 | 4/1987 | Baker | 43/131 |
| 4,730,412 | 3/1988 | Sherman | 43/131 |
| 4,815,231 | 3/1989 | McQueen | 43/121 |
| 4,979,330 | 12/1990 | Rorant | 43/139 |
| 5,033,229 | 7/1991 | Demarest et al. | 43/131 |
| 5,057,316 | 10/1991 | Gunner et al. | 43/132.1 |
| 5,058,312 | 10/1991 | Jackson | 43/132.1 |
| 5,175,958 | 1/1993 | Wedemeyer | 43/131 |
| 5,175,960 | 1/1993 | Wade et al. | 43/139 |
| 5,238,681 | 8/1993 | Chang et al. | 43/131 |
| 5,310,552 | 5/1994 | Gunner et al. | 43/121 |
| 5,490,349 | 2/1996 | Muramatsu | 43/121 |
| 5,810,191 | 9/1998 | Cornelius | 43/100 |
| 5,875,586 | 3/1999 | Ballard et al. | 43/131 |

FOREIGN PATENT DOCUMENTS

WO 92/22200   12/1992   WIPO ...................... 43/121

*Primary Examiner*—Michael J. Carone
*Assistant Examiner*—Darren W. Ark
*Attorney, Agent, or Firm*—Bauer & Schaffer, LLP

[57] ABSTRACT

An insect trap for attracting insects such as roaches and the like formed of a container defining a chamber holding bait. The container is provided with openings for the entry and exit of insects into the chamber, and a bait entry portal for the introduction of bait into the chamber. The bait entry portal is formed of elastomeric material openable upon exertion of a pressure thereon for introduction of bait and closeable upon removal of the pressure to seal said container.

6 Claims, 1 Drawing Sheet

INSECT BAIT TRAP

BACKGROUND OF THE INVENTION

The present invention relates to a bait trap for exterminating insects such as roaches and the like, and in particular to a refillable bait trap.

Traps, commonly referred to as baiters have been used in the past employing liquid bait to attract insects such as roaches and the like with what they most prefer, namely, darkness, harborage and moisture. Due to evaporation and the nature of the liquid bait, these baiters require frequent replenishing of water or liquid bait. A funnel or hole has been provided in such baiters for addition of water or liquid bait which could lead to spillage and human contact with toxins. Furthermore, such baiters are not designed to be completely hermetically sealed, since access to the bait by insects is required. This could lead to leakage of a toxic material, unwanted spillage and human contact with the toxins.

In some of the common baiter traps the deceased insects would block incoming live insects from partaking in the bait, necessitating disposal of the baiter or removal of the trapped insects from the baiter before the bait is exhausted.

Also known in the art is a baiter which adheres to a surface such as a wall and is filled with a gel-like insecticide. The gel employed overcomes the problem of leakage and avoids the speedy evaporation problems encountered with the use of liquid baits. The gel contains an attractive agent and still provides the desired moisture to attract the targeted insects. Upon exhaustion of the insecticide, the baiter must be removed from the surface to which it was adhered, often leaving a mark or a hole. The exhausted baiter would then be disposed of as ordinary waste, introducing any remnants of the insecticide in the disposed baiter as a toxin into the environment. The exhausted baiter must then be replaced by a fresh baiter which must be adhered to the surface.

U.S. Pat. No. 4,400,905 to Brown overcomes the problem of replacing an entire baiter by disclosing a refillable roach trap. However, the refill is a poisonous card impregnated with roach poison. The exhausted card must be disposed of, adding to toxins in the waste. Furthermore, the card is dry and does not provide the roach with the moisture which it prefers.

It is, therefore, the object of the present invention to provide a baiter which can be refilled without undesired messes, spillage or human contact with toxins.

It is a further object of the present invention to provide a baiter which attracts insects such as roaches with what they prefer most, namely, darkness, harborage, and moisture, yet does not require frequent refilling at the rate of liquid evaporation, but rather at longer intervals such as monthly or once the bait is exhausted by insects, depending on the degree of the roach problem.

It is a further object of the present invention to provide a baiter which will not deface the surface to which it is adhered due to removal each time the bait is exhausted.

It is a further object of the present invention to provide an insertion hole for a refill tube which maintains the tip of the tube to be clean and free of bait residue.

It is a further object of the present invention to maintain the bait free from dust, cleaning products or other contaminants.

It is a further object of the invention to eliminate waste, in particular the disposal of toxins into ordinary waste.

These objects, together with other objects and advantages, will be apparent from the following disclosure of the present invention.

SUMMARY OF THE INVENTION

Briefly, the present invention provides an insect trap for attracting insects such as roaches and the like comprising a container defining a chamber holding bait. The container is provided with openings for the entry and exit of insects into the chamber, and a bait entry portal for the introduction of bait into the chamber. The bait entry portal is formed of elastomeric material operable upon execution of a pressure thereon for introduction of bait and closeable upon removal of the pressure to seal said container.

Specifically the bait trap comprising a small flat container having a top cover joined to a base for holding bait. In the base are provided roach accesses for entry of the roach. These accesses, i.e. openings, are sized to allow the entry and exit of a single roach into and out of the container. The top cover is made of a flexible material having a plurality of slits. The slits are arranged in a spoke arrangement such that one end of each slit meets at a common point, such that the tip of a bait filled tube can be inserted at the common point for injecting bait into the container and the tip can be removed from the container so that no bait remains adhered to the tip.

Full details of the present invention are set forth in the following description and illustrated in the accompanying drawings.

DETAILED DESCRIPTION OF THE PRESENT INVENTION

Figure 1:
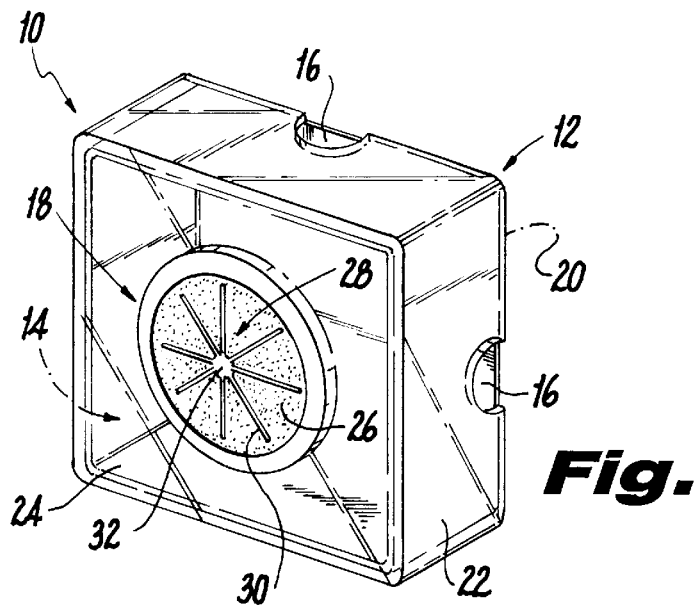
FIG. 1 is a perspective view of the refillable insect baiter according to the present invention.

As seen in the Figures, the refillable insect bait trap according to the present invention, generally depicted by the number 10, comprises a container 12 defining an interior chamber 14, and having openings 16 for entry of insects and a portal 18 for introduction of the bait.

As seen in FIG. 1, the container 12 is formed of a base wall 20, peripheral side walls 22 and a top cover wall 24. The side wall 22 are provided with the openings 16 sized to allow the entry and exit of an insect such as a roach into and out of the container 12. The openings 16 are positioned such that they are along the bottom edge of the wall and thus easily accessible to the roach. The top wall 24 seats on the side walls 20 and is preferably removable. The top wall 24 is provided in part with an elastomeric membranous material 26 which is penetrable upon exertion of pressure to form the portal 18 and resealable upon removal of the pressure.

Preferably, the top cover wall 24 is constructed of a flexible partition 28 which is provided with a plurality of radial slits 30. It is preferable that cover wall 24 be constructed from a translucent tinted plastic or the like so that a technician can easily determine the amount of bait remaining within the trap by simply shining a flashlight into the trap. The radial slits 30 are arranged spoke like such that the inner end of each slit 30 meets at a common point forming a bait entry 32, much in the manner of an iris construction. With the foregoing construction, the entry 32 has a great advantage, in that the chamber can be filled with bait using a conventional tube or gun device having an injection tip tube. Once fresh bait has been injected into the chamber, the tube tip may be extracted so that the slits 30 close, simultaneously wiping the tip clean. In this manner unwanted drippings or spillage is avoided. The closed slits 30 maintain the bait in the container 12 clean, protected from dust, cleaning products and other contaminants, while minimizing evaporation.

The insect openings 16 are preferably sized to allow a single roach or the like to enter and exit at a time. The size is kept to a minimum in order to avoid over exposure of the bait to the outside environment.

The bait is preferably in the form of any known and conventional insecticide gel which contains attractive agents and provides the desired moisture. Such a gel overcomes the problems associated with the use of liquid baits such as rapid evaporation and leakage so as to avoid unwanted mess and human or animal contact with toxins.

A gun or tube is preferably used to inject the bait into the container 12, since they provide a neat and easy method for refilling the trap without unwanted spill or human contact with toxins. The ability to thus easily refill the trap eliminates unnecessary waste, in particular toxic waste, as well as eliminating the need to deface a surface upon removal of an exhausted trap.

The bait used is preferably of the slow to kill type such that the roach will not be trapped at the entrance or within the container, thereby congesting the baiter. Preferably the roach ingests the bait and lives long enough to move outside the trap so that it expires at place that is easily cleaned or in its concealed nest. Furthermore, consumption by fellow roaches in the nest of the poisoned roach's droppings or the remains of the expired roach will result in the further ingestion of the bait, thereby spreading the effects of the bait throughout the nest.

Figure 2:
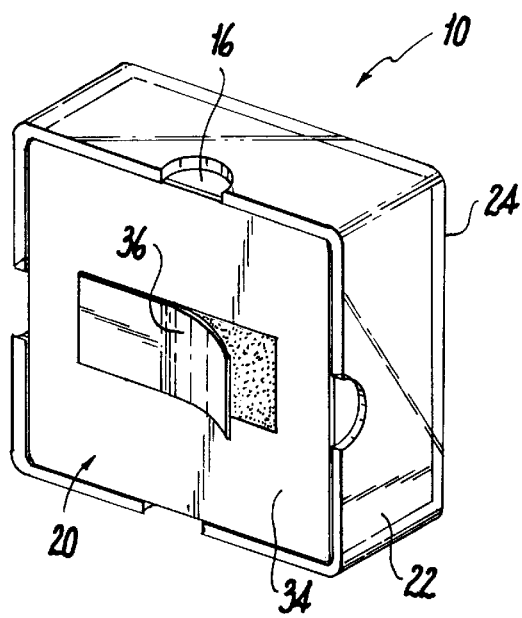
FIG. 2 is a plan view of the bottom of the base of the refillable insect baiter according to the present invention.

As seen in FIG. 2, the base wall 20 has an underside 34 to which is attached an adhesive peel off strip 36 for adhering the trap to a surface, such as a wall.

Figure 3:
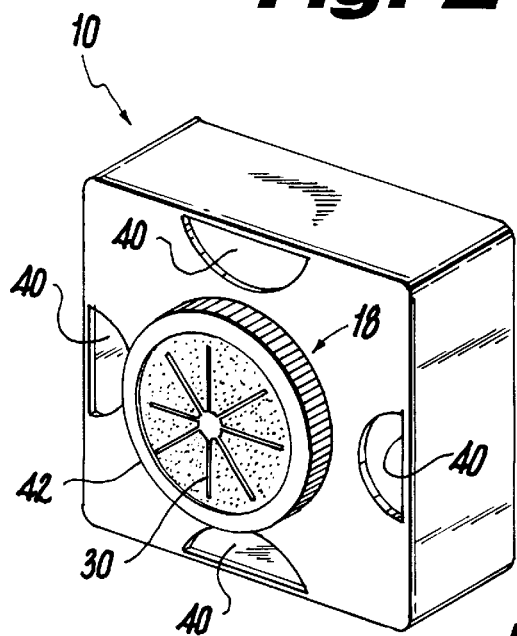
FIG. 3 is a top view of a second embodiment of the refillable insect baiter according to the present invention.

A second embodiment of the present invention is shown in FIG. 3. The insect trap is provided with a rigid non-flexible top cover 38 in which is provided a plurality of openings 40 located along each side edge. The central portion of the rigid top cover 38 is provided with a removable cap like ring 42 in which is integrally provided the portal 18 which the slits 30 are formed. The slits 30 although diagonally smaller than the slits in the first embodiment, are arranged and function in the same manner as the slits 30 in the earlier described embodiment.

The rigid cover 38 enables the device to be handled somewhat easier, while the smaller central slits reduces the amount of the bait open to the environment.

The refillable insect trap may be provided in various shapes or sizes. The size of the openings can vary depending on the type of insect or other unwanted pest targeted.

Various modifications have been suggested herein. Other changes and modifications will be apparent to those skilled in this art. It is, therefore, intended that the present disclosure be taken as illustrative only and not as limiting of the invention.

What is claimed is:

1. A refillable and reusable insect baiter for attracting insects comprising a container defining a chamber holding bait, said container provided with openings for allowing the entry and exit of insects into and from said chamber, and a bait entry portal for the introduction of bait into said chamber, said bait entry portal having an elastomeric closure normally sealing said chamber and openable upon exertion of a pressure thereon to permit introduction of bait into said chamber thereafter being automatically closable upon removal of pressure to seal said container.

2. The refillable and reusable insect baiter according to claim 1, wherein said container comprises a base having a bottom wall, peripheral side walls in which said openings are located and a top cover in which said bait entry portal is located.

3. The refillable and reusable insect baiter according to claim 2, wherein the base has a bottom surface to which a peel-off adhesive strip is attached, enabling fixed mounting of said container.

4. The refillable and reusable insect baiter according to claim 2, wherein said top cover is removable.

5. The refillable and reusable insect baiter according to claim 1, wherein said bait entry portal is constructed of a flexible membrane having a plurality of slits arranged in a spoke arrangement such that one end of each slit meets at a common point forming a bait injection entry allowing introduction of bait into the chamber while maintaining said container substantially closed.

6. The refillable and reusable insect baiter according to claim 1, wherein said bait is in the form of a gel.

* * * * *